ALFRED D. SCARBROUGH
ROBERT N. MELLOTT
INVENTORS
ELWOOD S. KENDRICK
BY Lester S. Hecht
Morris Spector
ATTORNEYS

ALFRED D. SCARBROUGH
ROBERT N. MELLOTT
INVENTORS

ELWOOD S. KENDRICK
BY Lester S. Hecht
Morris Spector
ATTORNEYS

ALFRED D. SCARBROUGH
ROBERT N. MELLOTT
INVENTORS

BY ELWOOD S. KENDRICK
[signatures]
ATTORNEYS

ALFRED D. SCARBROUGH
ROBERT N. MELLOTT
INVENTORS
ELWOOD S. KENDRICK
BY
ATTORNEYS

United States Patent Office 3,043,965

Patented July 10, 1962

3,043,965

AMPLIFIER CIRCUIT HAVING DEGENERATIVE AND REGENERATIVE FEEDBACK

Alfred D. Scarbrough, Palos Verdes Estates, and Robert N. Mellott, Los Angeles, Calif., assignors, by mesne assignments, to Thompson Ramo Wooldridge Inc., Cleveland, Ohio, a corporation of Ohio Filed Oct. 14, 1957, Ser. No. 689,960
12 Claims. (Cl. 307—88.5)

This invention relates to amplifier-regulating circuits, and more particularly to circuits which are arranged to provide regeneration for amplifiers without driving them into a saturation condition. In still further particular, the invention relates to transformer-coupled multivibrator circuits wherein the transformer is employed in a novel manner to regulate the amount of regenerative feedback to the cross-coupled amplifiers employed therein so that saturation is prevented and predetermined potential levels are established for triggering the multivibrator.

The amplifier-regulating feature of the invention is related specifically to the use of semi-conductor amplifiers, such as transistor amplifiers. However, the transformer-coupled multivibrator circuit may be employed with either semi-conductor amplifiers or vacuum tube amplifiers.

While the invention may have a multitude of applications, it is particularly useful in computer circuits where logical amplifiers and flip-flops or bistable multivibrator circuits are required. In general in prior art computer circuits, the flip-flop was either a so-called "dynamic" flip-flop wherein a pulse is regenerated to represent the logical "on" or "true" state of the device or a "static" device was employed having two states. The "dynamic" flip-flop was advantageous in providing a means for transformer-coupling logical pulse signals to various parts of the computer and thereby being able to readily match the flip-flop output circuit to a given load. This arrangement was disadvantageous, however, in requiring pulse synchronization to insure that the "dynamic" operation of the flip-flop corresponded to the computer timing and further various types of pulse-complementing circuits were required to develop the necessary logical signals for the system.

On the other hand, the flip-flop known in the prior art as the "static" flip-flop is more easily synchronized than the "dynamic" flip-flop but its use is disadvantageous because of the limitation on its ability to drive heavy loads.

An important feature of the invention, therefore, lies in the provision of amplifier-regulating circuits which are readily adapted to mechanize a transformer-coupled multivibrator circuit. According to the invention, the same transformer which constitutes the source of output signals also includes secondary windings for providing regenerative feedback for a rapid unambiguous change in state and for providing regulating negative feedback to prevent amplifier saturation as may occur in the use of transistors.

A transformer-coupled flip-flop, as contemplated according to the present invention, may be referred to as a phase bistable flip-flop since the logical input signals applied thereto may be employed to synchronize the device into either of two operating phases representing two corresponding logical states. In the logical operation of this type of flip-flop, then, the device is caused to change state at twice the information or conventional clock pulse rate. That is, a sequence from high to low between two clock pulses at a particular output terminal may constitute one phase and represent a "true" or "on" state of the flip-flop and a sequence where the device changes from low to high between successive information or clock pulses may be considered to be a second phase representing a 'false" or "off" state.

In its general structural form, a multivibrator mechanized to include all of the various features of the invention comprises first and second amplifiers, such as transistors, each having one output electrode, such as the collector of a transistor, coupled to an opposite end of the primary winding of a transformer. A first secondary winding of the transformer is arranged to provide regenerative feedback for the amplifiers, which may constitute positive feedback to the base electrode of, e.g., an NPN transistor.

Another feature of the invention resides in the gating arrangement when two transistors are employed in a multivibrator, the gating arrangement being employed to prevent an input signal from being applied to both transistors simultaneously.

According to another aspect of the invention, the first secondary winding is also arranged to provide a regulating or negative feedback to the output electrode of the amplifier, which may constitute the collector of a transistor, to terminate regeneration therein and thereby to prevent the transistor from being driven into saturation.

Perhaps the saturation region of regenerative amplifiers, in particular, is best described on pages 426 through 433 of Principles of Transistor Circuits by R. F. Shea (John Wiley & Sons, Inc., 1953). It will be noted in this book that the position of the region of saturation or the dividing line between the transition and saturation regions is a parameter variable with collector voltage. As the collector voltage is raised, the lower limit of the saturation current region increases. In accordance with a feature of the invention, this voltage is raised in order to prevent the transistor from being driven into saturation.

As a further feature of the invention, a second secondary winding may be included in the transformer described above, the second secondary winding being coupled between second output points in the amplifiers, which may be the emitter electrodes of the transistor. This second secondary winding is arranged to establish a predetermined potential difference between input and output electrodes of the amplifier, or base and emitter electrodes in the case of a transistor, so that it may be possible, for example, to establish zero volts as a temporary quiescent level thereat. Thus a small change in voltage may be employed to start regeneration.

In addition to providing a phase bistable flip-flop, which is readily synchronized with computer logic and may be easily matched to a given load because of its transformer coupling, several other improved features are available. Firstly, it should be noted that the phase bistable operation itself is advantageous where the computer digital information is stored in a memory in A.C. form. In this case no conversion is necessary in operating upon previously-stored information and in transferring computed results to the memory. Thus, the logical operation of a multivibrator circuit, according to the present invention, is well adapted for computer systems employing the so-called "Manchester" type of recording wherein a voltage change, i.e., from low to high or from high to low, is employed to represent a logical signal.

In addition, the regulating feedback feature of the invention is very important in high-speed computing applications where transistors or other similar semiconductor amplifiers are employed which may be driven into saturation. The invention, by its novel use of various transformer secondary connections, can be employed to establish a predetermined potential across the collector-emitter path of the transistor which, as well known, determines whether or not saturation may occur. This anti-saturation feature of the invention, of course, may be employed in a single amplifier circuit such as an NPN transistor amplifier. For example, in a pulse amplifier where positive operating potential is applied to the collector electrode of an NPN transistor through the primary winding of a transformer, the invention teaches that regulation to prevent saturation is possible by coupling the secondary of the transformer to the collector electrode in a manner which will raise the potential thereof to maintain the collector-to-emitter difference above a predetermined level, below which saturation would occur.

While the transformer regeneration feedback feature of the invention is, of course, not new by itself in an amplifier, the arrangement whereby an anti-saturation control can be obtained from the same transformer which provides regeneration as well as output signals is a novel feature according to the invention and makes it possible to insure the proper relationship between the feedback signal causing regeneration and the regulating signal which terminates regeneration. This feature of the invention may also be employed with a single amplifier circuit.

It may be noted that anti-saturation controls have been previously accomplished by establishing regulating potentials, for example, through biased diodes. The arrangement of the invention, however, obviates the necessity of additional sources to provide such regulation in that the same transformer which provides regeneration also establishes the anti-saturation regulation.

It is, therefore, an object of the invention to provide an improved multivibrator circuit which may be operated as a phase bistable flip-flop.

Another object of the invention is to provide means for regulating the current of a regenerative amplifier to prevent the saturation thereof.

A further object of the invention is to provide a phase bistable multivibrator which may be triggered with pulses producing a relatively small change in input voltage.

It is still another object of the invention to provide a transformer-coupled amplifier wherein anti-saturation regulation is accomplished without the necessity of additional regulating sources.

Yet another object is to provide a transformer-coupled transistor multivibrator wherein saturation is prevented in a simple manner.

The novel features which are believed to be characteristic of the inventon, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Figures 1, 2:
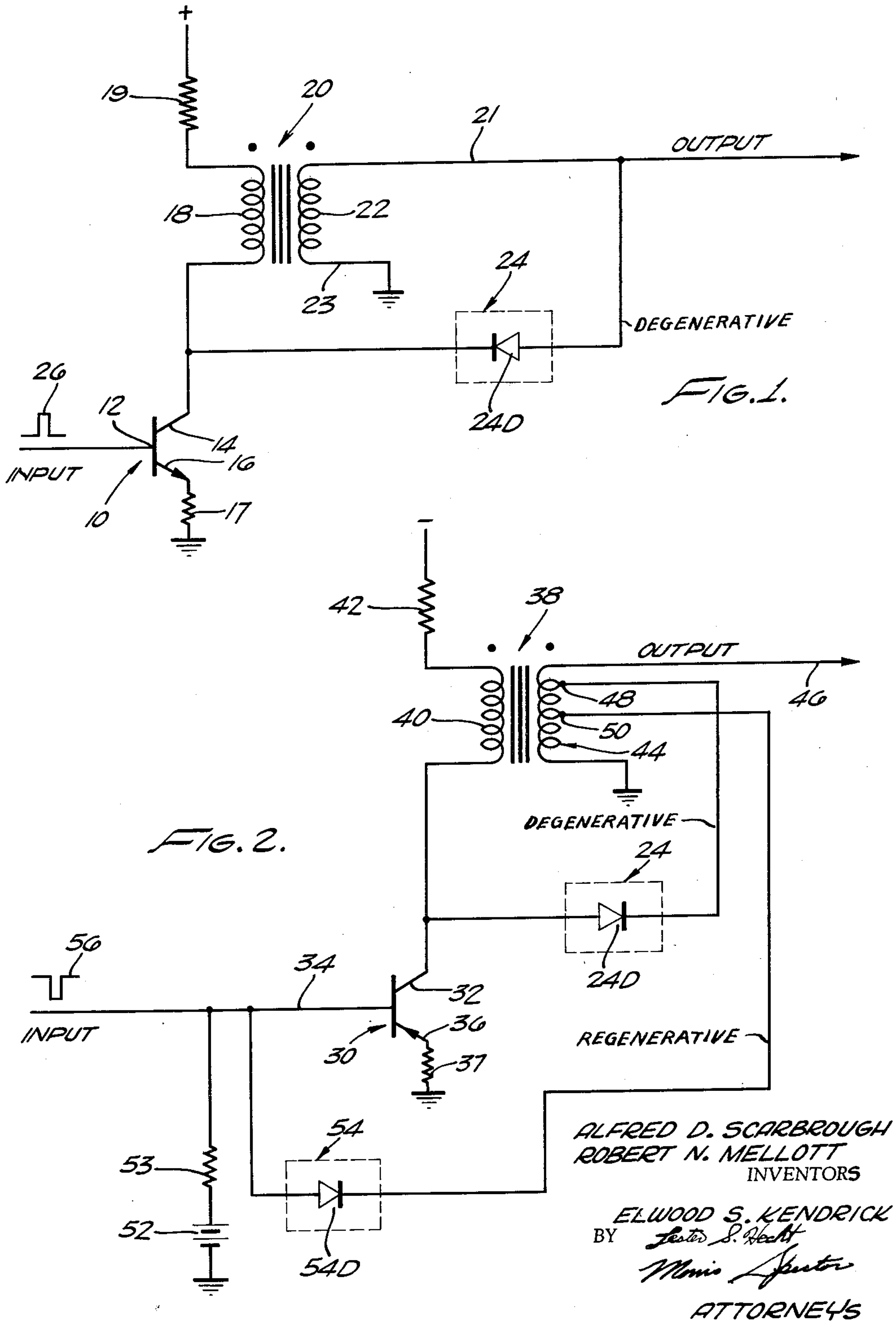
FIG. 1 is a schematic diagram of a transformer-coupled amplifier employing regulating feedback to prevent saturation, according to the invention.
FIG. 2 is a schematic diagram of a transformer-coupled amplifier utilizing both regenerative feedback and anti-saturation regulation according to the invention.

Reference is now made to FIG. 1 where an NPN transistor amplifier embodiment of the invention is shown employing the transformer feedback feature of the invention for preventing saturation. As indicated in FIG. 1, the amplifier includes a transistor 10 having a base electrode 12, a collector electrode 14, and an emitter electrode 16 coupled to a suitable reference potential such as ground through an emitter resistor 17. Since transistor 10 is an NPN type transistor, a positive potential is applied to the collector 14 through a resistor 19 coupled in series with the primary winding 18 of a transformer 20. One end of the secondary winding 22 of transformer 20 receives a reference potential such as ground and the other end is connected to an output lead 21 providing an output signal. Coupling means 24, including a diode 24D, is connected from output lead 21 to the lower end of primary winding 18. Diode 24D has its anode connected to the output lead 21 and its cathode to the lower end of primary winding 18 because a positive source of direct-current voltage is employed in connection with an NPN-type transistor. It is to be noted that diode 24D should be poled in the opposite direction when negative direct-current voltage is employed with a PNP-type transistor.

Dots are shown at the ends of windings 18 and 22 to represent the phase of voltage induced in one with respect to the other. It will be noted then that if the voltage rises in primary winding 18 at the dot end thereof, the voltage in the secondary winding 22 will also rise at the dot end thereof.

According to the anti-saturation feature of the invention, output lead 21 is coupled back to the collector electrode 14 of the transistor in a manner such that any increase in potential across the primary winding of the transformer will raise the potential of the collector electrode. In this manner, the collector voltage of the transistor 10 can be regulated to prevent the transistor from entering into that region of current conduction where it is substantially insensitive to base current signal changes i.e., its saturation region. Emitter load resistor 17 may be selected to insure that the proper emitter current passes through the resistor.

If regeneration is desired in the amplifier, transformer 20 may be modified somewhat to provide additional taps thereon so that the saturation regulating feedback and positive or regenerative feedback may be accurately determined relative to each other. Such an arrangement is illustrated in FIG. 2 where a PNP transistor 30 having a collector 32, a base 34, and an emitter 36 is employed. A PNP transistor has been shown in the circuit of FIG. 2 merely to illustrate that this type of transistor as well as an NPN type may be incorporated in all embodiments of the invention. The operating potentials in the embodiment of FIG. 2 are reversed with respect to those of FIG. 1 due to the use of a PNP type transistor. A negative potential is applied through a resistor 42 and the primary winding 40 of transformer 38 to collector 32. The emitter electrode of the transistor is coupled to ground through a suitable emitter resistor 37.

The secondary winding 44 of transformer 38 has an output lead 46 and a tap 48 to which coupling means 24 is connected providing a saturation control applied to collector 32.

In addition a tap 50 is present to which feedback coupling means 54 is connected which provides regeneration to the base 34 of transistor 30. The regeneration path is biased by an appropriate source 52 connected to coupling means 54 through a resistor 53 across which an input to base 34 is developed.

It will be noted in both of coupling means 24 in the embodiments of FIGS. 1 and 2 that a diode is illustrated as a suitable device. The diodes in both cases are poled to maintain the collector-to-emitter potential above and below a predetermined potential difference, respectively, above and below which saturation would occur, respectively. In the embodiment of FIG. 2, diode 24D must be arranged to provide for feedback of a negative signal whereby the collector voltage is lowered in response to a negative input signal, such as signal 56, to maintain a collector-to-emitter potential difference preventing saturation. In a similar manner, diode 24D of FIG. 1, illustrated as one suitable type of coupling means 24, is arranged to provide for feedback of a positive signal to prevent saturation in response to a positive input pulse, such as pulse 26.

The arrangement of the invention shown in FIG. 2 is advantageous in making it possible to regulate accurately the ratio between the regenerative feedback and the anti-saturation control. This is accomplished by selecting a predetermined turns ratio between the taps 48 and 50. Furthermore, the anti-saturation control is changed proportionately with the amplitude of the input signal shifting the load characteristic of transistor 30 in accordance with changes in input signal amplitude.

Figure 3:
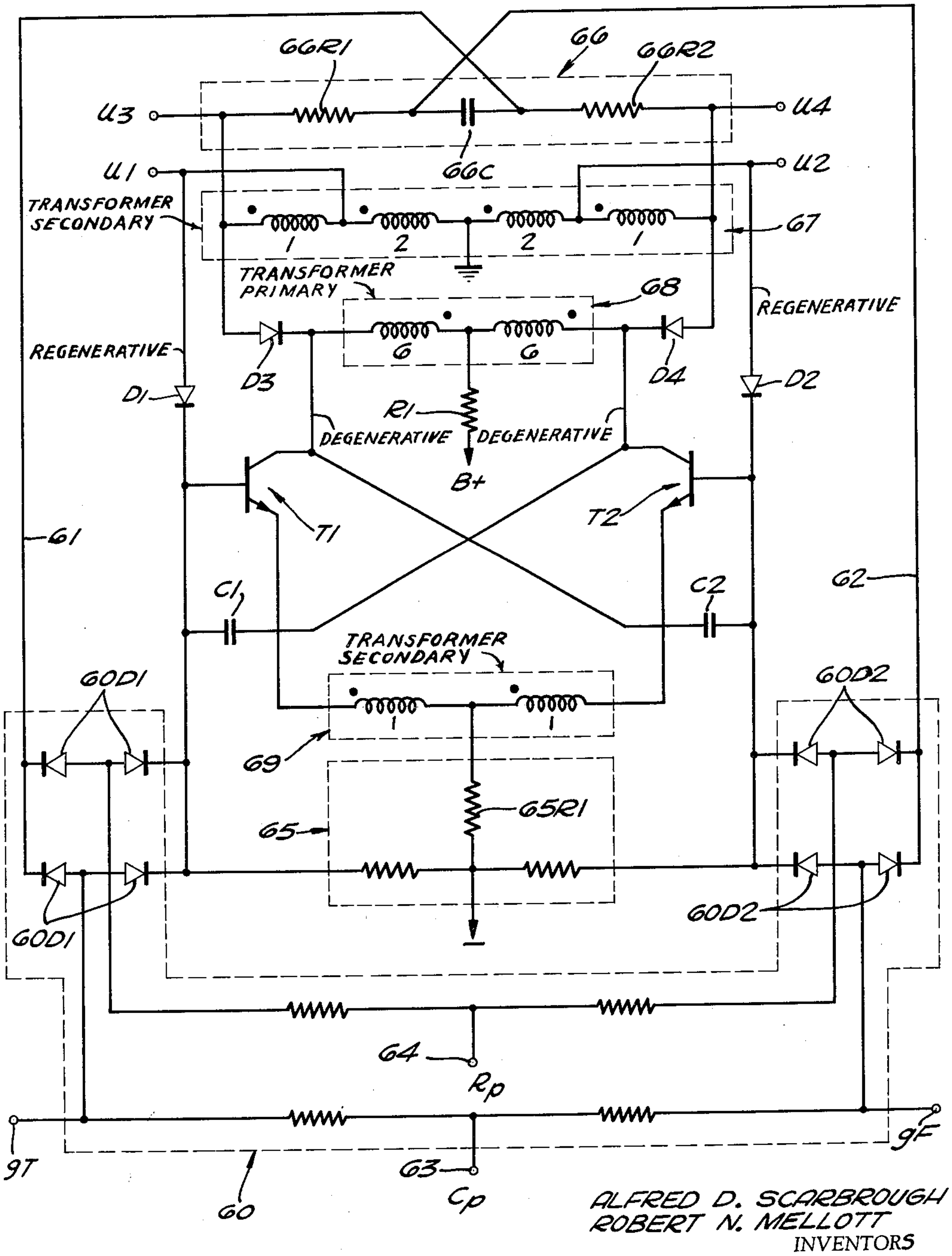
FIG. 3 is a schematic diagram of a phase bistable flip-flop constructed in accordance with several features of the invention.

The amplifier-regulating features of the invention are well adapted for use in a multivibrator circuit, such as is shown in FIG. 3. In this embodiment, NPN transistors T1 and T2 have their collector electrodes coupled to opposite ends of a primary winding 68 of a transformer, the center tap of which receives a suitable B+ potential through a resistor R1. A first secondary winding 67 inductively coupled to primary winding 68 has its opposite outer ends coupled through diodes D3 and D4 to the collector electrodes of transistors T1 and T2 providing the anti-saturation control previously discussed with reference to FIGS. 1 and 2. In addition, intermediate taps are provided in winding 67 for regenerative feedback through diodes D1 and D2 to the base electrodes of transistors T1 and T2, respectively. The outer ends of winding 67 may provide high output signals U3 and U4 as indicated and the intermediate taps may provide lower output signals U1 and U2. The center tap of winding 67 receives a suitable reference potential such as ground.

A second secondary winding 69 is coupled between the emitter electrodes of transistors T1 and T2 and receives a suitable negative potential at a center tap thereof through an emitter resistor 65R1 which forms part of a biasing circuit 65.

The trigger response of the multivibrator is enhanced by cross-coupling capacitors C1 and C2 coupled between the base of transistor T1 and the collector of transistor T2 and the base of transistor T2 and the collector of transistor T1.

Gating means 60 is provided to insure that triggering input signals are applied only to that transistor which is not conducting at the time of pulse application. Means 60 includes a first set of diodes 60D1 associated with the base input electrode of transistor T1 and a second set of diodes 60D2 associated with the base electrode of transistor T2. These diodes are arranged in a well-known manner to prevent any triggering of the transistor unless the other transistor is in its conducting state. This operation will be discussed below.

A signal of a polarity representing the state of conduction of the multivibrator transistors is stored in storage means 66 including a capacitor 66C connected between resistors 66R1 and 66R2, which are, in turn, connected to diodes D3 and D4, respectively. Capacitor 66C then has the end connected to resistor 66R2 connected to diode set 60D1 via lead 61 to provide a control signal therefor. The other end of capacitor 66C is coupled to resistor 66R1 connected to diode set 60D2 via lead 62.

Gating means 60 also includes a network for applying two types of pulses, referred to as clock pulses *Cp* and reset pulses R*p* hereinafter, to input terminals 63 and 64, respectively. In addition, input terminals are provided for applying true-setting and false-setting signals to the multivibrator referenced as *g*T and *g*F.

Figure 4A:
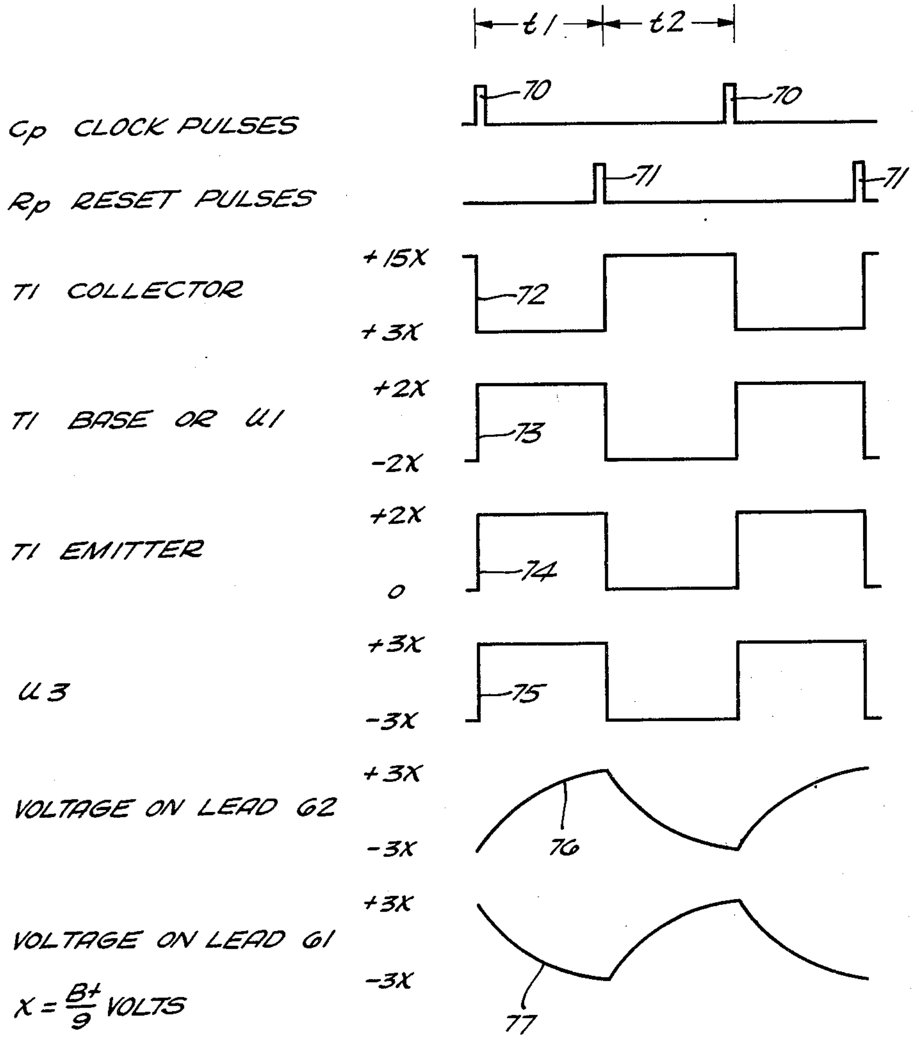
FIGS. 4*a* and 4*b* are graphs of a group of waveforms characteristic of the operation of the embodiment of the invention shown in FIG. 3.
Figure 4B:
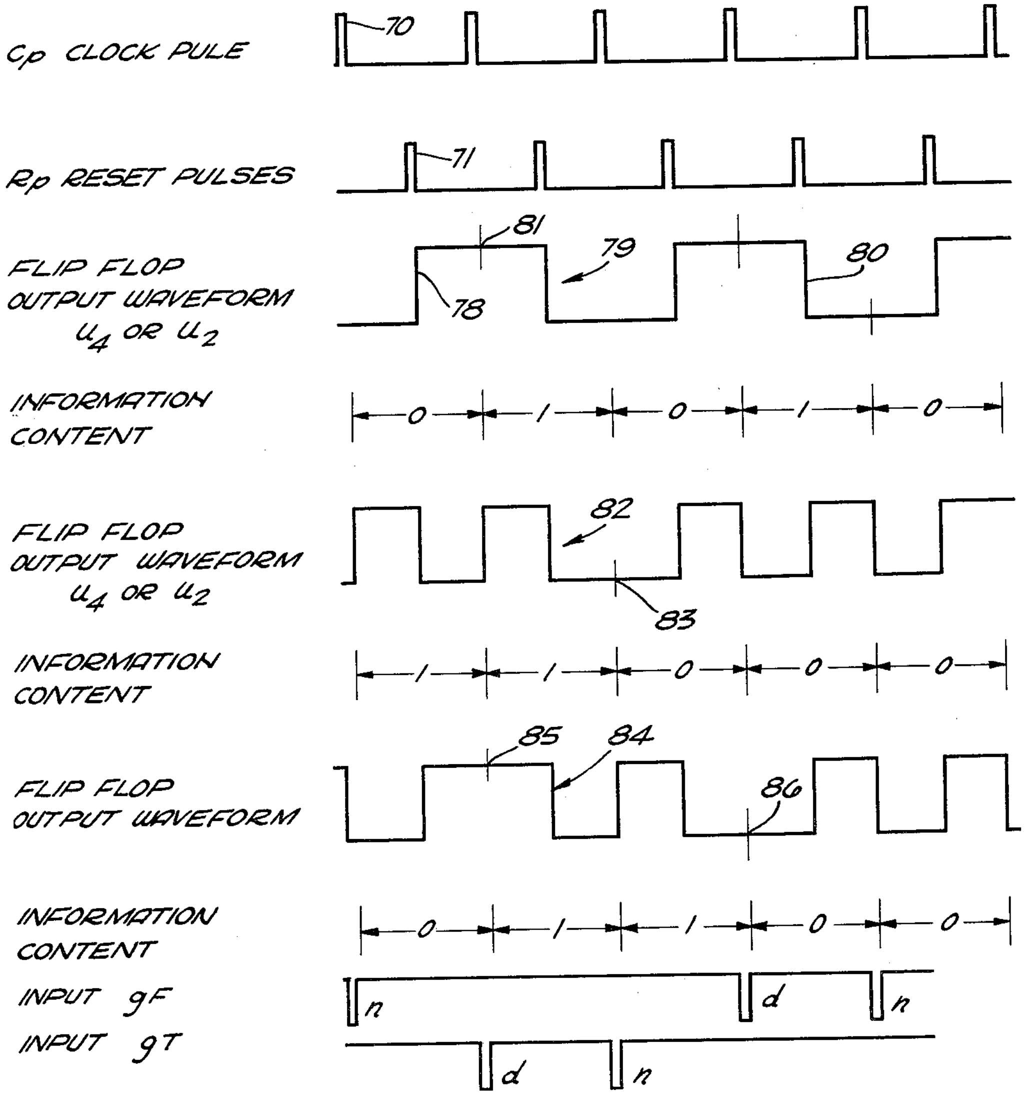

The operation of the circuit shown in FIG. 3 can best be described with reference to typical waveforms such as are shown in FIGS. 4*a* and 4*b*. As indicated in FIG. 4*a*, clock pulses C*p*, designated individually as pulses 70, are spaced by an interval *t*1+*t*2. Reset pulses R*p* are spaced by a similar amount but are interspaced between clock pulses 70 occurring after time interval *t*1. Thus pulses 71 are shown to follow each previous clock pulse 70 by an amount *t*1.

Waveform 72 is shown representing the signal appearing at the collector electrode of transistor T1 under a condition where no change-of-information signals are applied to terminals *g*T or *g*F. This operation may be considered to illustrate a single-phase state of the multivibrator.

During the time interval *t*1, transistor T1 is conducting and T2 non-conducting. To illustrate typical voltage conditions, the following arrangement of the transformer will be assumed. Relative numbers will be attributed to the turns of the windings of the transformer and their winding direction is indicated by dots in FIG. 3. Thus each section of winding 68 is given a relative number of six turns whereas the sections of winding 67 between the intermediate taps and center tap are each given a relative winding number of two turns and the end sections thereof a relative winding number of one turn. Winding 69 also has each section with a relative number of turns indicated to be one. It will be understood, of course, that the actual number of turns in all windings may be considerably higher than the relative numbers given. For example, each section of winding 68 may have thirty turns or five times its relative ratio number.

With this assumption, then, the voltage levels at various points during the operation to be described are dependent upon a factor which will be called X which is equal to the potential B+ applied to the center tap of winding 68, divided by nine, where nine is the summation of the relative winding numbers connected in series between B+ and ground in the primary and first secondary sections of the transformer.

During time *t*1, then, when transistor T1 is conducting, the voltage at the collector of transistor T1 is indicated in waveform 72 to be approximately 3X, where X is defined as above to be equal to B+/9. This results because the output level U3 developed across the left-hand section of winding 67 is equal to $X+2X$ and forward biases diode D3 and thereby establishes the collector voltage for transistor T1.

In the other state of the multivibrator when transistor T2 is conducting, the voltage 3X apppears at its collector being passed through diode D4. At this time, corresponding to interval *t*2 in FIG. 4*a*, the voltage appearing at the collector of transistor T1 is 15X which may be considered to be the summation of 3X appearing at the collector of transistor T2, 6X appearing across the right-hand section of winding 68, and 6X appearing across the left-hand section of winding 68.

The base of transistor T1 is shown in FIG. 4*a* as waveform 73. This voltage varies between +2X and −2X being applied to the base through diode D1 and corresponding also to output signal U1.

This voltage is regulated by the signal derived from the left-hand intermediate tap on winding 67.

Finally, the emitter voltage of transistor T1 is regulated to change between +2X during the conducting state of transistor T1 and ground or zero volts during the non-conduction state thereof.

The time constants of the circuit are selected so that the inductance of the transformer windings appears to be relatively large compared to the pulse frequency of operation so that the leading and trailing edges of the waveforms are practically straight vertical lines due to regeneration and no discernible decay takes place during the intermediate portions of the rectangular waveforms.

From the description thus far, it should now be apparent that the transformer-regulating technique of the invention fairly accurately establishes all of the electrode potentials for the transistors in the circuit. In the example given, the anti-saturation regulating feedback is set at 3X, below which the collector voltage cannot fall due to the feedback through diodes D3 and D4. The positive feedback to the base of the transistors is regulated at 2X being passed through diodes D1 and D2, and the emitter potential is set to zero volts for the non-conducting transistor and 2X for the conducting transistor.

The feature of the emitter biasing is another subcombinational aspect of the invention which may have separate utility apart from the anti-saturation control and regenerative feedback control. According to this technique, it is possible to establish any desired base-to-emitter voltage difference. In the illustrated case, the setting of the emitter voltage reference at zero volts for the non-conducting transistor means that the circuit will be very sensitive to any input signal rising above ground which is capable of supplying actuating current.

Furthermore, the arrangement whereby all biasing and regulating voltages are derived from the same transformer and have relative turns ratios with respect to each other is very effective. It permits the accurate selection of output and input signals to insure the maximum reliability of circuit operation. Thus where a multivibrator, according to the present invention, is employed in a computer, the true and false signals can be made to swing between very wide positive and negative limits whereas the triggering levels required to actuate various flip-flops or multivibrators may be kept very low. This means that the logical gating circuit may be very reliable but yet that the triggering power required may be small.

The voltage across capacitor 66C is shown as it appears on leads 61 and 62 and is noted to be a typical charging and discharging pattern. The important thing to note is that the capacitor always stores a signal at the end of an interval corresponding to its previous state and may be used then to control the next pulse application to the multivibrator in a manner which will now be described with reference to FIG. 4*b*.

The following convention will be assumed in describing the manner in which information or logical signals are entered into the multivibrator of FIG. 3. It will be assumed that a negative input signal must be applied to input terminal *g*T to set the flip-flop or multivibrator to its "true" or "one" state and that a negative signal must be applied to input terminal *g*F to set the flip-flop to its "false" or "zero" state. Furthermore, it will be assumed that the state of the flip-flop is represented by a waveform change, such as is indicated in FIG. 4*b* in the waveform portion 78 forming part of the complete waveform 79. It will be noted that the voltage level changes from a low state to a high state between clock pulses 70. This information is considered to be a zero or to represent the false state of the flip-flop as represented by either of signals U4 or U2. Thus a sequence where transistor T2 is originally cut off at the beginning of a clock pulse interval and then becomes conducting at the end of the interval is considered to represent a false state. In a similar manner, a sequence where transistor T2 is conducting at the beginning of a clock pulse interval and non-conducting at the end of the interval is considered to represent a true state or a one condition.

Waveform 79 then will be noted to change state during successive clock pulse periods. This results because clock pulses 70 are assumed to be suppressed successively by negative signals applied to input terminals *g*T and *g*F so that only reset pulses R*p* are effective to change the state of the multivibrator.

The function of the inputs *g*T and *g*F to drain off current generated by clock pulses C*p* may be better understood with reference to the inputs *g*F and *g*T shown in FIG. 4*b* in relation to the waveform 84 shown therein. It is to be noted that where inputs *g*F and *g*T are indicated at the letter *d*, clock pulse current is drained off. For example, in the negative pulse indicated at *d* for the *g*F input, the multivibrator can change state only upon the application of a clock pulse to the base of transistor T2. However, this is impossible because at terminal *g*F, a negative voltage is applied to prevent this condition. Similarly, for the negative voltage pulse *d* to the input *g*T indicated in FIG. 4*b*, it would normally be necessary for a clock pulse to be applied to the base of transistor T1. However, as before, clock current is drained off by the application of the negative voltage to input terminal *g*T. Where negative voltages *n* are provided at inputs *g*F and *g*T, they have no effect on the change of state of the multivibrator. For example, negative voltages *n* applied to the *g*F terminal, as indicated in FIG. 4*b*, will drain off clock current but only at the *g*F terminal. Under the conditions of the prior state of the multivibrator indicated in waveform 84, this will not make any difference because application of a voltage pulse to the base of transistor T1 will cause the multivibrator to change state. This is not prevented since no negative voltage is applied at terminal *g*T. Hence, under this condition, the clock pulse current which enables the multivibrator to change state is not drained off. Similarly, the negative voltage applied to the input terminal *g*T shown in FIG. 4*b* indicated at *n*, it is true, will drain off clock pulse current at terminal *g*T; however, it is to be noted that according to the prior state of the multivibrator, the application of a clock pulse to the base electrode of transistor T2 will cause it to change state. Clock pulse current will not be suppressed at terminal *g*F because no negative voltage is applied thereto. Hence, the multivibrator will then again change state.

No pulse, either R*p* or C*p*, is ever applied to a transistor in the multivibrator unless it is in a non-conducting state. This control is effected through diode groups 60D1 and 60D2. Control by group 60D1 will be explained. Control by group 60D2 will not since its operation will be analogous to that of group 60D1. It will be assumed for purposes of explanation that transistor T1 is non-conducting. As previously pointed out, in this state the output signal appearing on lead 61 is approximately +3X which back biases the diodes connected to lead 61. A positive pulse R*p* or C*p* then is effective to pass through either of the other two diodes in group 60D1 to the base electrode of transistor T1 driving it into conduction.

On the other hand, when transistor T1 is conducting, the signal on lead 61 falls to approximately −3X thus forward biasing the diodes connected thereto and suppressing either of pulses R*p* or C*p* so that no current may pass to transistor T1. Capacitor 66*c* serves to delay changes in voltage on lines 61 and 62 at least for the full duration of the clock and reset pulses C*p* and R*p*, in order to prevent the diode groups 60D1 and 60D2, which serve to steer the pulses, from switching during their application.

To illustrate the manner in which the state of the flip-flop may be changed, it will be assumed as in waveform 82 that the original state is true or one. This means that transistor T2 is not conducting at the end of the interval. In order to maintain the flip-flop in the true state it is necessary that a clock pulse actuate transistor T2. This will occur as long as the false input terminal *g*F does not receive a negative signal suppressing clock pulse C*p*.

The transition from a true state to a false state occurs in waveform 82 at point 83 at which time it is assumed that a negative signal is applied to terminal *g*F. This signal has the effect of suppressing any clock pulse by effectively diverting it from diode network 60D2. Since no actuating pulse is applied to transistor T2, it remains in its non-conducting state and the waveform change then during the following clock pulse interval is from low to high which has been assumed to represent a false state.

The transition from a false state to a true state is illustrated in waveform 84 where at point 85 it is assumed that transistor T2 is conducting and that transistor T1 is non-conducting. In this case the suppression of a clock pulse by means of a negative signal applied to terminal *g*T prevents a pulse from being applied to transistor T1 to drive it into conduction so that it remains non-conducting and transistor T2 remains conducting. The waveform pattern then during the following clock pulse interval changes from high to low assumed to represent a true state.

From the foregoing description, it should now be apparent that the present invention provides various improvements for regulating and controlling amplifier circuits which may be employed in multivibrators.

It has been shown that the novel usage of a transformer according to the invention permits the accurate regulation of regeneration, anti-saturation control, and input bias levels.

It will be understood that while transistors have been used throughout to illustrate the invention, many of the features are applicable to other types of amplifiers. Furthermore, certain features of the invention are subcombinational in nature and may find utility apart from the preferred embodiment shown in FIG. 3. Thus it is possible that the feature illustrated by the use of winding 69 shown in FIG. 3 may be used independently of either winding 67 or 68 to establish predetermined bias levels.

It should be further understood that these few variations which have been pointed out are by no means exhaustive of the other changes which are possible without departing from the scope of the invention as defined in the appended claims.

What is claimed is:

1. A circuit for preventing saturation in a regenerative amplifier, said circuit comprising: an amplifier device having first and second output electrodes and a current control electrode; a transformer having a primary winding and a secondary winding; first and second direct-current reference potentials; said primary winding having a first end coupled to said first output electrode and a second end coupled to said first reference potential; first coupling means connecting a first end of said secondary winding to find first output electrode, said secondary winding having an output voltage phase to provide negative feedback and thereby to regulate the potential thereof; second coupling means connecting a tap on said secondary winding to said current control electrode, said tap being positioned on said secondary winding to provide a feedback voltage in phase with the change in voltage on said current control electrode to provide regeneration; and means connecting said second output electrode to said second reference voltage.

2. The circuit defined in claim 1 wherein said amplifying device is a transistor having collector and emitter output electrodes and a base control electrode, said first coupling means being a diode arranged to regulate the potential between said collector and emitter electrodes to prevent saturation in said transistor.

3. The circuit defined in claim 1 wherein said amplifying device is a transistor having a base electrode and said second coupling means is a diode arranged to provide regenerative feedback between said secondary winding and the base electrode of said transistor.

4. A multivibrator comprising: first and second amplifiers each having an output circuit including a pair of electrodes and a current path therebetween, said output circuits being controlled through first and second control electrodes; a transformer having a primary winding having first and second ends and a tap therebetween, said first end being coupled to one electrode of said first amplifier and said second end being coupled to the corresponding electrode in said second amplifier, and a secondary winding having first and second ends and a tap therebetween; means for establishing a voltage difference between center taps in said primary and secondary windings; first coupling means for connecting predetermined points of said secondary winding to said first and second amplifiers to provide respective regenerative feedback paths therefor; and second coupling means connecting the first and second ends of said secondary winding to the corresponding ends of said primary winding to regulate the voltage across the respective output circuits.

5. The combination comprising: first and second transistors each having collector, base, and emitter electrodes; a transformer having a primary winding with first and second ends coupled to the collector electrodes of said first and second transistors, respectively, and a center tap; said transformer including a secondary winding having first and second ends, a center tap, and first and second intermediate taps at predetermined points between said first and second ends, respectively, and said center tap; means coupling the first and second ends of said secondary winding to the collector electrodes of said first and second transistors, respectively, with a phase to provide negative feedback; means for coupling said first and second intermediate taps to the base electrodes of said first and second transistors, respectively, with a phase to provide positive feedback; and means for applying bias potentials to said center taps and to said emitter electrodes.

6. The combination comprising: first and second transistors each having collector, base, and emitter electrodes; a transformer having primary and secondary windings each having first and second ends and a center tap; means for applying a predetermined potential across the center taps of said primary and secondary windings; means for coupling the first and second ends of said primary winding to the collector electrodes of said first and second transistors, respectively; and means for coupling the first and second ends of said secondary winding to the emitter electrodes of said first and second transistors, respectively, the turns ratio between said primary and secondary windings being selected to establish a predetermined voltage difference across each transistor for each conductive state thereof.

7. A multivibrator comprising: two amplifiers each having conducting paths through a corresponding pair of electrodes and a corresponding current control electrode; a transformer having a primary winding connected between corresponding ones of each of said electrode pairs; said transformer also including a first secondary winding; means for applying a direct current voltage between a center tap on said primary winding and a center tap on said first secondary winding; first coupling means connected from intermediate taps at corresponding positions on opposite sides of the center tap on said first secondary winding to a current control electrode of a corresponding amplifier to provide a feedback path thereto; second coupling means connected between the ends of said first secondary winding and said same corresponding ones of said electrode pairs, respectively, to stop regeneration at a selected voltage at said corresponding ones of said electrode pairs; and a second secondary winding in said transformer connected between the other ones of said electrode pairs.

8. The multivibrator defined in claim 7 wherein said amplifiers are transistors, said pairs of output circuit electrodes are the collector and emitter electrodes of corresponding transistors, and said current control electrodes are the base electrodes of said transistors.

9. The multivibrator defined in claim 7 wherein said coupling means are diodes.

10. The multivibrator defined in claim 7 wherein a storage capacitor is coupled across said first secondary winding to retain a signal representing the state of said multivibrator.

11. The combination comprising: an amplifier circuit having two output circuit electrodes, constituting terminals for a controllable current-conduction path through said output circuit, and a control electrode; a transformer having primary and secondary windings, said primary winding have one end connected to one of said output electrodes; a source of direct-current potential; means for applying said direct-current potential to the other end of said primary winding, said direct-current potential being selected to tend to cause current conduction through said current-conduction path; means for applying input signals to said control electrode to cause current flow through said current-conduction path; means for applying a reference potential to a first end of said secondary winding, said primary and secondary windings being arranged to cause a potential having the sense of said input signal, in response thereto, at a second end of said secondary winding; and means coupling the second end of said secondary winding to said one of said output circuit electrodes to limit the output voltage drop across said output circuit electrodes and thereby prevent saturation in said amplifier.

12. The combination comprising: an amplifier circuit including a multielectrode semiconductor device having base, emitter, and collector electrodes; a transformer having primary and secondary windings, said primary winding having one end connected to said collector electrode; a source of direct-current potential; first means for applying said direct-current potential across the other end of said primary winding and said emitter electrode to forward bias the current-conduction path between said collector and emitter electrodes; an input circuit for receiving a signal for causing the current flow between said collector and emitter, said primary being wound to cause a potential having the sense of said input signal to appear at said other end thereof; second means for applying a second direct-current reference potential to one end of said secondary, said secondary being wound to cause a potential at the other end thereof having the sense of the input signal; and third means for coupling the other end of said secondary winding to said collector electrode to develop a regulating voltage having a sense opposite to that created at said collector by said input signal.

References Cited in the file of this patent

UNITED STATES PATENTS

| | | |
|---|---|---|
| 2,760,088 | Pittman, et al. | Aug. 21, 1956 |
| 2,810,080 | Tousdale | Oct. 15, 1957 |
| 2,819,352 | Houck | Jan. 7, 1958 |
| 2,935,626 | MacSorley | May 3, 1960 |

OTHER REFERENCES

Bright et al.: "Transistors as On-Off Switches in Saturable Core Circuits in Electrical Manufacturing," December 1954, pages 70–82.

Pittman Jr.: "Transistor Control of Magnetic Amplifiers," Feb. 1954, Radio-Electronic Engineering.